(12) United States Patent
Luo et al.

(10) Patent No.: US 10,342,083 B1
(45) Date of Patent: Jul. 2, 2019

(54) CURRENT DRIVING CONTROL FOR HIGH BRIGHTNESS LED MATRIX

(71) Applicant: Monolithic Power Systems, Inc., San Jose, CA (US)

(72) Inventors: Zheng Luo, San Jose, CA (US); Junjian Zhao, San Jose, CA (US); Tong Chen, San Jose, CA (US); Yu-Huei Lee, New Taipei (TW)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 16/022,642

(22) Filed: Jun. 28, 2018

(51) Int. Cl.
  *G09G 5/02* (2006.01)
  *G09G 5/10* (2006.01)
  *H05B 33/08* (2006.01)

(52) U.S. Cl.
  CPC ....... *H05B 33/0827* (2013.01); *H05B 33/089* (2013.01)

(58) Field of Classification Search
  CPC ....... G09G 2320/0276; G09G 2360/16; G09G 2320/0626; G09G 3/3648; G09G 3/3611; G09G 3/2014; G09G 3/2022; G09G 3/2029; G09G 2320/0247; G09G 2320/0266; G09G 3/3688; G09G 2330/021; G09G 2310/027; G09G 5/006; G09G 2320/043; G09G 3/3233; G09G 2300/0842; G09G 2300/0861; G09G 2320/0233; G09G 3/3614; G09G 3/3655; G09G 3/20; G09G 5/02; G09G 5/393; G09G 3/2051; G09G 5/06; G06T 11/001
  See application file for complete search history.

(56) References Cited

U.S. PATENT DOCUMENTS

| 8,758,111 | B2 * | 6/2014 | Lutnick | ............... G07F 17/3276 273/292 |
| 2014/0364219 | A1 * | 12/2014 | Matsushita | ......... G07F 17/3211 463/31 |

* cited by examiner

*Primary Examiner* — Minh D A
(74) *Attorney, Agent, or Firm* — Perkins Coie LLP

(57) ABSTRACT

A LED driving system for a LED matrix having a plurality of LEDs connected in parallel. The LED driving system includes a plurality of driving modules. Each one of the plurality of driving modules drives a corresponding one of the plurality of LEDs. Each one of the plurality of driving modules can include a local current driver receiving a reference current and providing a driving current to the corresponding one LED, and a local current tuning module receiving a U-bit current tuning command to tune the driving current for the corresponding one LED to reach a desired driving current using the U-bit current tuning command which provides a predetermined number of tuning steps ranging from 0 to 2U.

20 Claims, 5 Drawing Sheets

CURRENT DRIVING CONTROL FOR HIGH BRIGHTNESS LED MATRIX

TECHNICAL FIELD

This disclosure relates generally to light emitting diode ("LED") drivers, and more particularly but not exclusively relates to current driving circuits for LED matrix.

BACKGROUND

Large matrix of high-brightness light emitting diodes ("LEDs") is more and more popular in applications such as large light sources matrix, high brightness LED matrix displays and automotive LED headlight systems etc. Fast and efficient driving control to such LED matrix with smart brightness adjusting and high brightness uniformity regulation is desired.

SUMMARY

In accomplishing the above and other objects, there has been provided, in accordance with an embodiment of the present disclosure, a LED driving system for a LED matrix having a plurality of LEDs connected in parallel, comprising: a plurality of driving modules, wherein each one of the plurality of driving modules is configured to drive a corresponding one of the plurality of LEDs. Each one of the plurality of driving modules may comprise: a local current driver having a driver input terminal configured to receive a reference current and a driver output terminal configured to provide a driving current to the corresponding one LED; and a local current tuning module having a U-bit input terminal configured to receive a U-bit current tuning command comprising U bits, wherein U is a positive integer, and wherein the local current tuning module is configured to tune the driving current for the corresponding one LED to reach a desired driving current using the U-bit current tuning command providing a predetermined number of tuning steps, and wherein the predetermined number ranges from 0 to $2^U$.

There has also been provided, in accordance with an embodiment of the present disclosure, a driving module for a LED, comprising: a current driver having a driver input terminal configured to receive a reference current and a driver output terminal configured to provide a driving current to the LED; and a current tuning module having a U-bit input terminal configured to receive a U-bit current tuning command comprising U bits, wherein U is a positive integer, and wherein the current tuning module is configured to tune the driving current to reach a desired driving current using the U-bit current tuning command providing a predetermined number of tuning steps, and wherein the predetermined number ranges from 0 to $2^U$.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Those skilled in the art should understand that the meanings of the terms identified above do not necessarily limit the terms, but merely provide illustrative examples for the terms.

Figure 1:
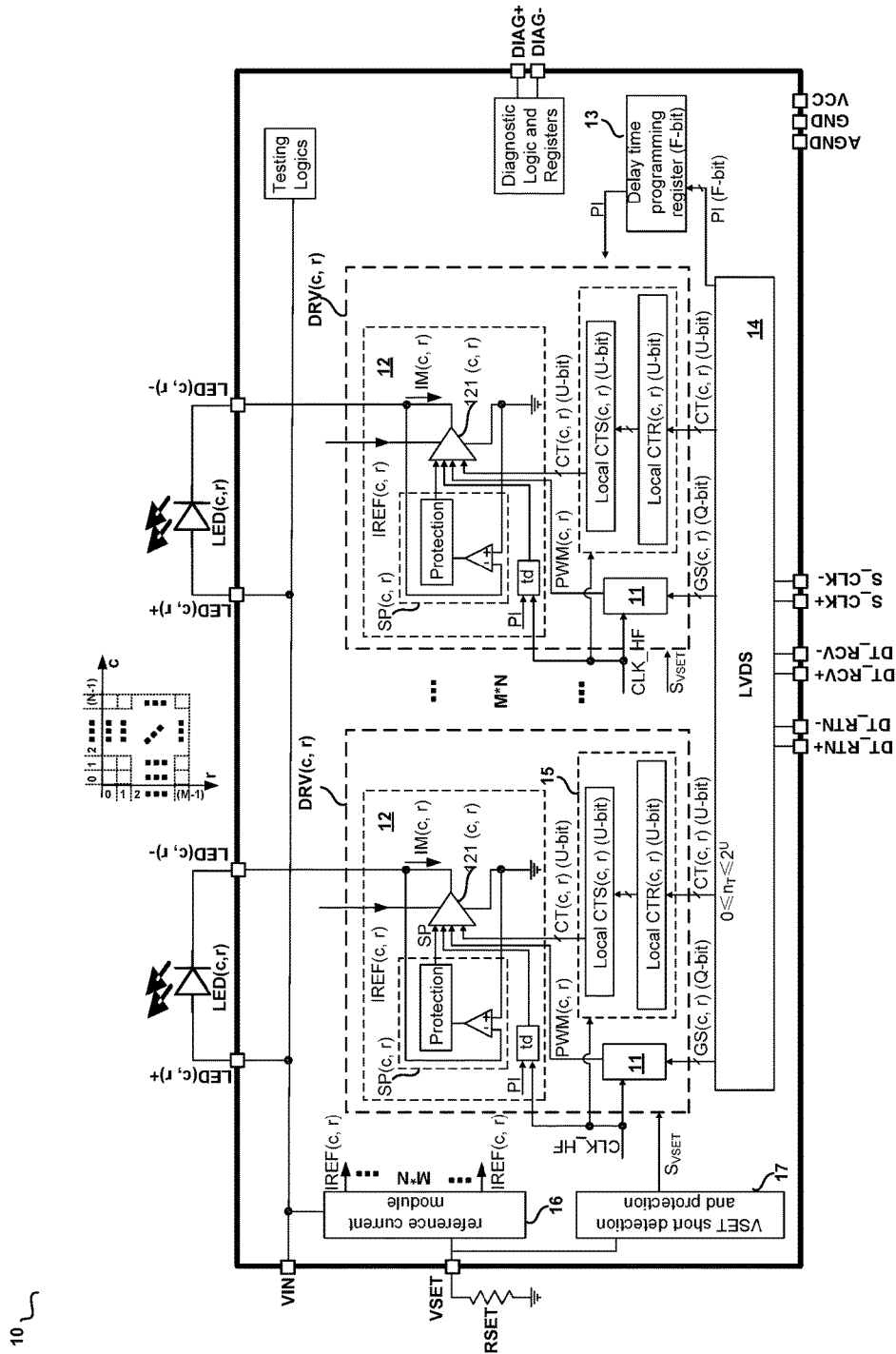
FIG. 1 illustrates a block diagram of a LED matrix driving system 10 in accordance with an embodiment of the present invention.

FIG. 1 illustrates a block diagram of a LED matrix driving system 10 in accordance with an embodiment of the present invention. The LED matrix driving system 10 is provided to drive a LED matrix including a plurality of LEDs connected in parallel and arranged in a LED matrix of M rows and N columns, expressed by {LED(c, r), c=0, 1, . . . , N−1, r=0, 1, . . . , M−1}, wherein M and N are integers greater than 1. Each one LED, e.g. the LED(c, r) in the $c^{th}$ column and $r^{th}$ row in the LED matrix may be connected between a LED positive port LED(c, r)+ and a LED negative port LED(c, r)−, wherein c is an integer ranging from 0 to N−1, and r is an integer ranging from 0 to M−1. The LED matrix driving system 10 may comprise a corresponding plurality of driving modules, wherein each one of the corresponding plurality of driving modules is configured to drive a corresponding one of the plurality of LEDs and to adjust the brightness/flux of the corresponding one LED using Q-bit grayscale command ("GS"), wherein Q is an integer greater than 0.

That is to say, for the LED matrix of M rows and N columns, the LED matrix driving system 10 may comprise M by N (i.e. M*N) driving modules, expressed by {DRV(c, r), c=0, 1, . . . , N−1, r=0, 1, . . . , M−1}. For each c=0, 1, . . . , N−1 and r=0, 1, . . . , M−1, each one of the M by N driving modules, e.g. the DRV(c, r) is configured to drive the corresponding one LED(c, r) and to adjust the brightness/flux of the corresponding one LED(c, r) using Q-bit grayscale command comprising Q bits. In this manner, for each one LED(c, r) in the LED matrix, the Q-bit grayscale command can provide $2^Q$ grayscale adjusting steps, respectively indicative of 0% to 100% brightness of the LED(c, r). For instance, for the LED(c, r) in the $c^{th}$ column and $r^{th}$ row, the adjusted brightness in percentage may be expressed by the following equation (1):

$$\text{Brightness of LED}(c,r) \text{ in percentage} = GS(c,r)/2^Q * 100\% \quad (1)$$

In the above equation (1), the parameter GS(c, r) is a programmed grayscale command value for the LED(c, r) provided to the corresponding one LED driving module DRV(c, r) for the LED(c, r). The programmed grayscale command value GS(c, r) may range from 0 to $2^Q$. Therefore, the brightness of the LED(c, r) in the $c^{th}$ column and $r^{th}$ row may be determined by a ratio of the programmed grayscale command value GS(c, r) for the LED(c, r) to $2^Q$.

In accordance with an embodiment of the present invention, each one of the corresponding plurality of driving modules (e.g. the driving module DRV(c, r), for each c=0, 1, . . . , N−1 and r=0, 1, . . . , M−1) may comprise a local GS control module 11. The local GS control module 11 of the driving module DRV(c, r) for the LED(c, r) may have a Q-bit input terminal configured to receive the programmed grayscale command value GS(c, r) which may comprise Q bits for the LED(c, r) and provide a pulse width modulated grayscale control signal PWM(c, r) indicative of the programmed grayscale command value GS(c, r) for the LED(c, r). The pulse width modulated grayscale control signal PWM(c, r) may have a pulse width modulated by the programmed grayscale command value GS(c, r), and may be configured to adjust the brightness of the corresponding one LED(c, r).

In accordance with an embodiment of the present invention, each one of the corresponding plurality of driving modules (e.g. the driving module DRV(c, r), for each c=0, 1, . . . , N−1 and r=0, 1, . . . , M−1) may further comprise a local driving circuit 12. For each c=0, 1, . . . , N−1 and r=0, 1, . . . , M−1, the local driving circuit 12 for the corresponding one LED(c, r) may comprise a local current driver 121(c, r). The local current driver 121(c, r) may have a driver input terminal configured to receive a reference current IREF(c, r) and a driver output terminal configured to provide a driving current IM(c, r) to the corresponding one LED(c, r). The local current driver 121(c, r) may further have a control terminal configured to receive the pulse width modulated grayscale control signal PWM(c, r) from the corresponding local GS control module 11 for the corresponding one LED(c, r), and to enable the driving current IM(c, r) during the pulse width of the pulse width modulated grayscale control signal PWM(c, r) to control the on duration as well as the grayscale of the corresponding one LED(c, r).

In accordance with an embodiment of the present invention, each one of the corresponding plurality of driving modules (e.g. the driving module DRV(c, r), for each c=0, 1, . . . , N−1 and r=0, 1, . . . , M−1) may further comprise a local current tuning module 15. The local current tuning module 15 of the driving module DRV(c, r) for the corresponding one LED(c, r) may have a U-bit input terminal configured to receive a U-bit current tuning command CT(c, r) comprising U bits {CT(c, r)[U−1], . . . , CT(c, r)[0]}, wherein U is a positive integer, and may be configured to tune the driving current IM(c, r) for the corresponding one LED(c, r) to reach a desired driving current IM(c, r)$_{desire}$ using the U-bit current tuning command CT(c, r). For each b=0, . . . , U−1, the $b^{th}$ bit CT(c, r)[b] of the U-bit current tuning command CT(c, r) may have a first logic level (e.g. logic high) and a second logic level (e.g. logic low). In this manner, for each one LED(c, r) in the LED matrix, the U-bit current tuning command CT(c, r) can in maximum provide $2^U$ available current tuning steps. In various embodiments, the local current tuning module 15 may be configured to use the U-bit current tuning command CT(c, r) to provide a predetermined number $n_T$ of tuning steps to tune the driving current IM(c, r) to reach the desired driving current IM(c, r)$_{desire}$, wherein the predetermined number $n_T$ may range from 0 to $2^U$. For instance, in an embodiment, U=4, and thus the 4-bit current tuning command CT(c, r) can provide $2^4=16$ available current tuning steps at maximum. The local current tuning module 15 may be configured to use the 4-bit current tuning command CT(c, r) to provide 10 tuning steps, i.e. the predetermined number $n_T$ is set to 10 according to practical application requirement.

In accordance with an embodiment of the present invention, for each c=0, 1, . . . , N−1 and r=0, 1, . . . , M−1, the local current tuning module 15 of the driving module DRV(c, r) for the corresponding one LED(c, r) may comprise: a clock input terminal configured to receive a clock signal CLK_HF having a high frequency (e.g. 65 MHZ), and a local U-bit current tuning command register CTR(c, r). The local U-bit current tuning command register CTR(c, r) may be configured to receive and refresh the U-bit current tuning command CT(c, r) for the corresponding one LED(c, r). The local U-bit current tuning command register CTR(c, r) may be further configured to transfer the U-bit current tuning command CT(c, r) to the local current driver 121(c, r) for the corresponding one LED(c, r).

In accordance with an embodiment of the present invention, for each c=0, 1, . . . , N−1 and r=0, 1, . . . , M−1, the local current tuning module 15 of the driving module DRV(c, r) for the corresponding one LED(c, r) may optionally further comprise: a local U-bit current tuning level shifter CTS(c, r). The local U-bit current tuning level shifter CTS(c, r) may have U bits input terminals to respectively receive the U bits CT(c, r)[U−1], . . . , CT(c, r)[0] of the U-bit current tuning command CT(c, r), and may be configured to apply a level shift to each bit of the U-bit current tuning command CT(c, r) to provide a level shifted U-bit current tuning command (still labeled with CT(c, r) for simplicity). In this fashion, each bit of the level shifted U-bit current tuning command CT(c, r) will have enhanced driving capability.

In accordance with an embodiment of the present invention, still referring to FIG. 1, the LED matrix driving system 10 may further comprise a reference current module 16. The reference current module 16 may be coupled to a current setting pin VSET of the LED matrix driving system 10. A customer programmable resistive device RSET may be connected to the current setting pin VSET. The reference current module 16 may be configured to provide a corresponding plurality of reference currents {IREF(c, r), c=0, 1, . . . , N−1, r=0, 1, . . . , M−1} to the plurality of driving modules {DRV(c, r), c=0, 1, ..., N−1, r=0, 1, ..., M−1} based on a reference voltage VREF and the resistive device RSET.

Figure 2:
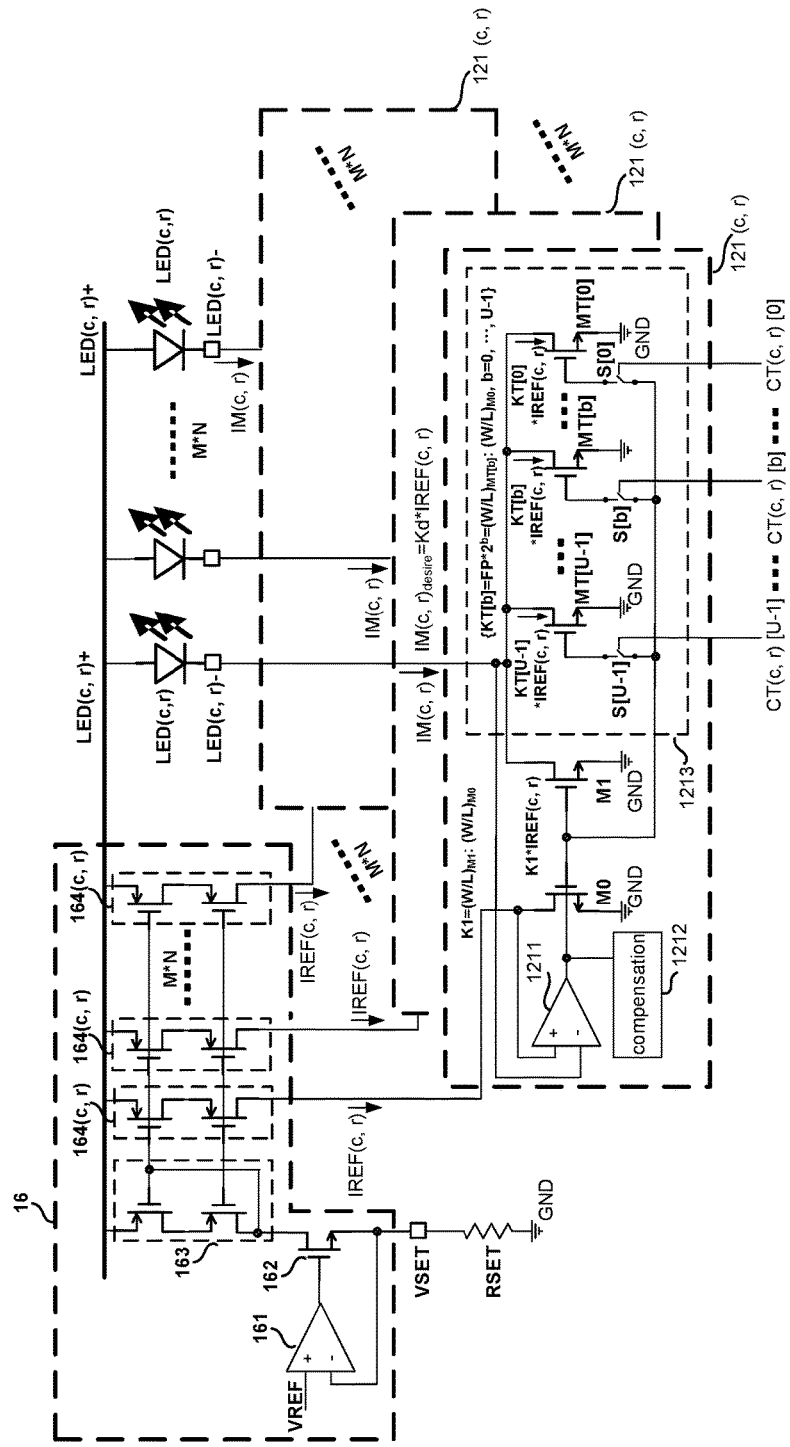
FIG. 2 illustrates a schematic diagram showing an exemplary reference current module 16 and an exemplary local current driver 121(c, r) in accordance with an embodiment of the present invention.

Referring to FIG. 2, a schematic diagram showing an exemplary reference current module 16 and an exemplary local current driver 121(c, r) in accordance with an embodiment of the present invention are illustrated out. The reference current module 16 may comprise an operational amplifier 161, a transistor 162, a diode connected cascode transistor 163 and a plurality of cascode output transistors {164 (c, r), c=0, 1, ..., N−1, r=0, 1, ..., M−1}.

For each c=0, 1, ..., N−1 and r=0, 1, ..., M−1, the local current driver 121(c, r) for the corresponding one LED(c, r) may comprise an operational amplifier 1211, a compensation circuit 1212, an input current branch M0, a mirror current branch M1, and a tuning current branch 1213 comprising U controllable current branches MT[U−1], ..., MT[0] respectively controlled by the U bits CT(c, r)[U−1], ..., CT(c, r)[0] of the U-bit current tuning command CT(c, r). The input current branch M0 may have a first terminal coupled to a first input terminal (e.g. the non-inverse "+" input terminal) of the operational amplifier 1211, a second terminal connected to the reference ground GND and a control terminal coupled to an output terminal of the operational amplifier 1211. The first terminal of the first current branch M0 may also be configured to receive the reference current IREF(c, r). The mirror current branch M1 may have a first terminal coupled to a second input terminal (e.g. the inverse "−" input terminal) of the operational amplifier 1211 and also to the output terminal of the local current driver 121(c, r), a second terminal connected to the reference ground GND and a control terminal coupled to the control terminal of the first current branch M0. The mirror current branch M1 may be configured to mirror the reference current IREF(c, r) with a mirror coefficient K1 and to provide the mirrored current K1*IREF(c, r) at the first terminal of the mirror current branch M1. For each b=0, ..., U−1, the $b^{th}$ controllable current branch MT[b] of the U controllable current branches MT[U−1], ..., MT[0] may have a first terminal coupled to the second input terminal (e.g. the inverse "−" input terminal) of the operational amplifier 1211 and also to the output terminal of the local current driver 121(c, r), a second terminal connected to the reference ground GND and a control terminal coupled to the control terminal of the first current branch M0 via a $b^{th}$ controllable switch S[b], wherein the $b^{th}$ controllable switch S[b] is controlled by the $b^{th}$ bit CT(c, r)[b] of the U-bit current tuning command CT(c, r). The $b^{th}$ controllable current branch MT[b] may be configured to mirror the reference current IREF(c, r) with a $b^{th}$ tuning coefficient KT[b] to provide a $b^{th}$ tuning current KT[b]*IREF(c, r) (i.e. the $b^{th}$ tuning current is equal to the $b^{th}$ tuning coefficient multiplied by the reference current IREF(c, r)) at the first terminal of the $b^{th}$ controllable current branch MT[b] when the $b^{th}$ controllable switch S[b] is closed in response to the first logic level of the $b^{th}$ bit CT(c, r)[b] of the U-bit current tuning command CT(c, r).

In accordance with an embodiment of the present invention, the input current branch M0 may comprise an input transistor (also labeled with M0) having low drain to source voltage drop. The mirror current branch M1 may comprise a mirror transistor (also labeled with M1) having low drain to source voltage drop. For each b=0, ..., U−1, the $b^{th}$ controllable current branch MT[b] of the U controllable current branches MT[U−1], ..., MT[0] may comprise a $b^{th}$ tuning transistor (also labeled with MT[b]) having low drain to source voltage drop. For this situation, the mirror coefficient K1 may be determined by a ratio of a conduction channel width to length ratio $(W/L)_{M1}$ of the mirror transistor M1 to a conduction channel width to length ratio $(W/L)_{M0}$ of the input transistor M0, i.e. $K1=(W/L)_{M1}:(W/L)_{M0}$. For each b=0, ..., U−1, the $b^{th}$ tuning coefficient KT[b] may be determined by a ratio of a conduction channel width to length ratio $(W/L)_{MT[b]}$ of the $b^{th}$ tuning transistor MT[b] to a conduction channel width to length ratio $(W/L)_{M0}$ of the input transistor M0, i.e. $KT[b]=(W/L)_{MT[b]}:(W/L)_{M0}$.

In the exemplary embodiment shown in FIG. 2, for each c=0, 1, ..., N−1 and r=0, 1, ..., M−1, the driving current IM(c, r) for the corresponding one LED(c, r) can be tuned by controlling the U controllable current branches MT[U−1], ..., MT[0] of the tuning current branch 1213 in the local current driver 121(c, r) through the U-bit current tuning command CT(c, r). A difference between every two successive tuning steps of the predetermined number $n_T$ of tuning steps may be determined by the $b^{th}$ tuning coefficient KT[b]. In an exemplary embodiment, the $b^{th}$ tuning coefficient KT[b] may be set to be proportional to $2^b$ with a predetermined precision factor FP, wherein the predetermined precision factor FP is positive and may be the same or different for each b=0, ..., U−1.

In accordance with an embodiment of the present invention, the desired driving current IM(c, r)$_{desire}$ may be proportional to the reference current IREF(c, r) with a desired coefficient $K_d$, i.e. IM(c, r)$_{desire}$=$K_d$*IREF(c, r). One or more bits of the U-bit current tuning command CT(c, r) are in default at the first logic level while the rest bits of the U-bit current tuning command CT(c, r) are at the second logic level. For this situation, the controllable current branches controlled by the one or more first logic level bits provide the tuning currents in default. The sum of the tuning coefficients of the controllable current branches controlled by the one or more first logic level bits may be set to be the desired coefficient $K_d$ minus the predetermined mirror coefficient K1 of the mirror current branch M1.

Figure 3:
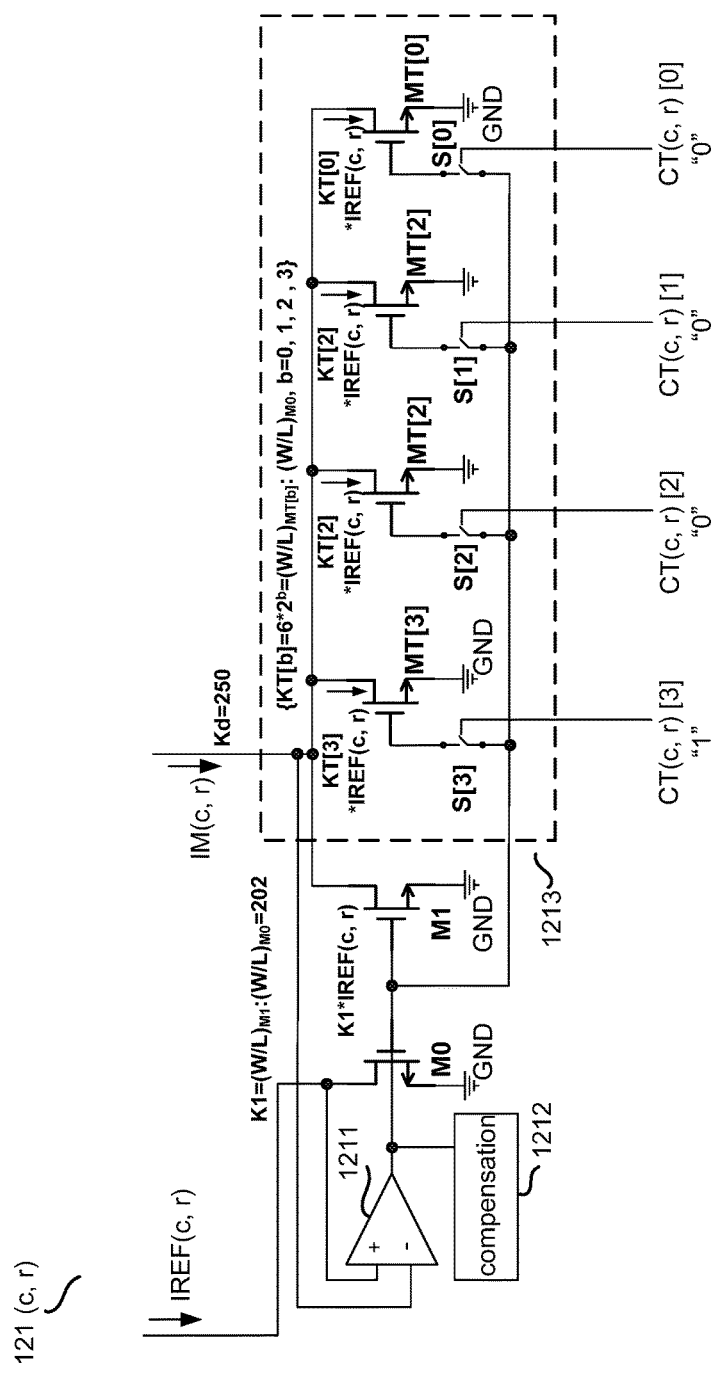
FIG. 3 illustrates an exemplary local current driver 121(c, r) with a 4-bit tuning current branch 1213 comprising 4 controllable current branches MT[3], MT[2], MT[1], MT[0] in accordance with an embodiment of the present invention.
Figure 4:
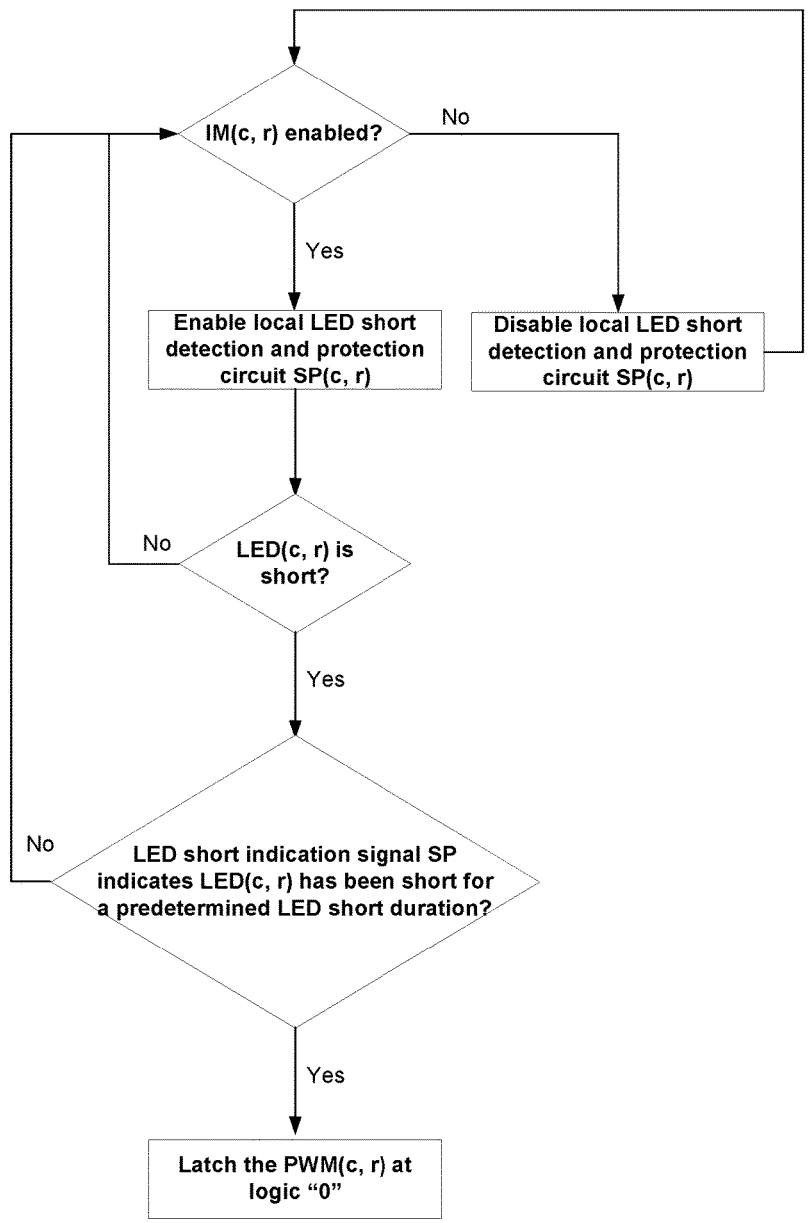
FIG. 4 illustrates an exemplary flowchart showing an operation procedure of the local LED short detection and protection circuit SP(c, r) in accordance with an embodiment of the present invention.
Figure 5:
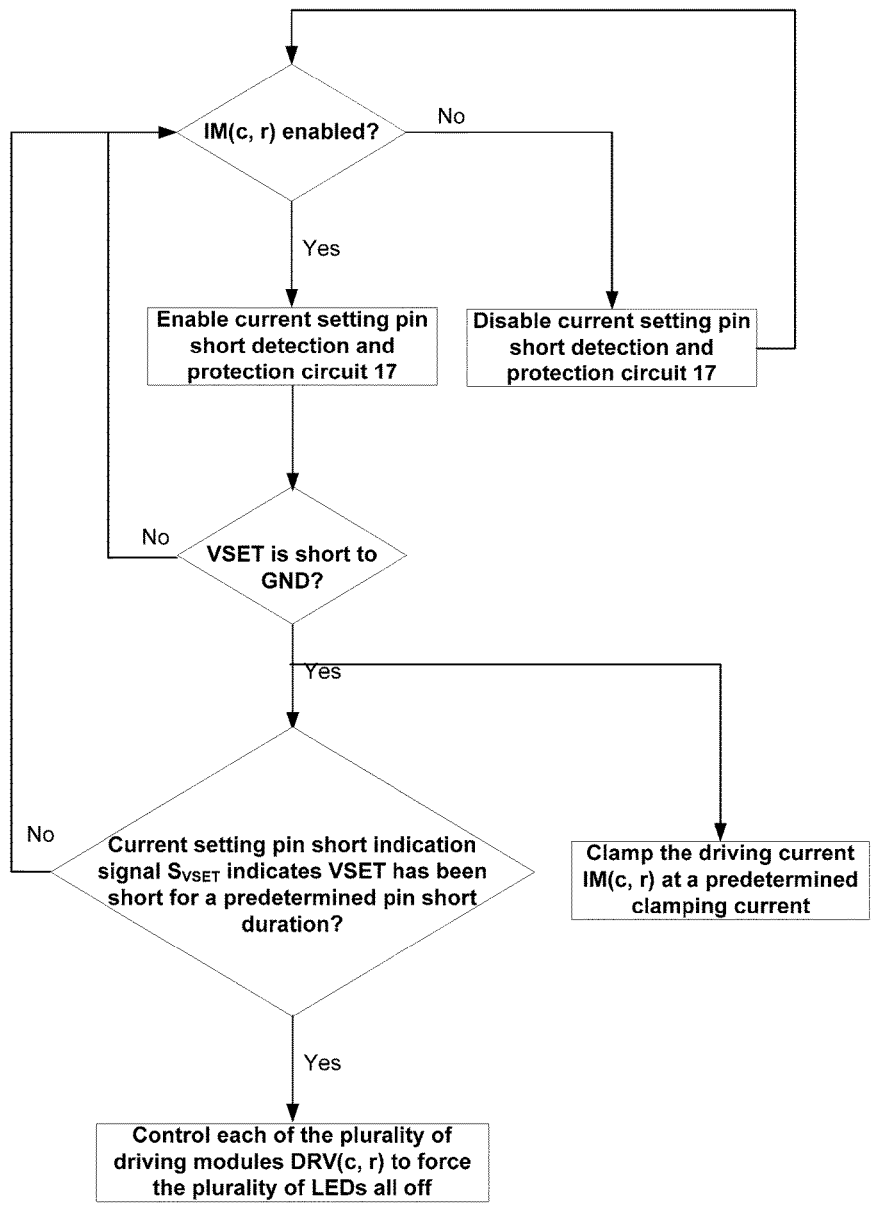
FIG. 5 illustrates an exemplary flowchart showing an operation procedure of the current setting pin detection and protection circuit 17 in accordance with an embodiment of the present invention.

To provide an example to help better understand various embodiments of the present invention, FIG. 3 illustrates an exemplary local current driver 121(c, r) with a 4-bit tuning current branch 1213 comprising 4 controllable current branches MT[3], MT[2], MT[1], MT[0] respectively controlled by the 4 bits CT(c, r)[3], CT(c, r)[2], CT(c, r)[1], CT(c, r)[0] of a 4-bit current tuning command CT(c, r). That is to say, in this example, U=4, suppose $n_T$=16 and the desired driving current IM(c, r)$_{desire}$ for the corresponding one LED(c, r) should be of 250 times the reference current IREF(c, r), i.e. $K_d$=250. The mirror coefficient K1 of the mirror current branch M1 may be set to 202, i.e. K1=202. For each b=0, 1, 2, 3, the $b^{th}$ tuning coefficient KT[b] of the $b^{th}$ controllable current branch MT[b] of the 4 controllable current branches MT[3], MT[2], MT[1], MT[0] may be set to KT[b]=6*$2^b$. That is to say, the predetermined precision factor FP for the $b^{th}$ controllable current branch MT[b] is equally chosen to be 6 for each b=0, 1, 2, 3, i.e. FP=6 for each b=0, 1, 2, 3 in this example. And thus, the difference between every two successive tuning steps of the predetermined 16 tuning steps is 6. As an example, in default, one bit (e.g. the $3^{rd}$ bit CT(c, r)[3]) of the 4-bit current tuning command CT(c, r) is set at the first logic level (e.g. high logic "1") while the rest bits CT(c, r)[2], CT(c, r)[1], CT(c, r)[0] are at the second logic level (e.g. low logic "0"). Thus the $3^{rd}$ controllable current branch MT[3] controlled by the $3^{rd}$ bit CT(c, r)[3] which is in default set to a first logic level bit is on (i.e. the $3^{rd}$ controllable switch S[3] is closed and the $3^{rd}$ controllable current branch MT[3] provides the $3^{rd}$ tuning current KT[3]*IREF(c, r) at the first terminal of the 3rd controllable current branch MT[3]) and the rest 3 controllable current branches MT[2], MT[1], MT[0] are off (i.e. the controllable switches S[2], S[1] and S[0] are open and the rest 3 controllable current branches MT[2], MT[1], MT[0] do not provide tuning currents) in default. For this situation, the sum of the tuning coefficients (in this example: KT[3]) of the controllable current branches controlled by the one or more first logic level bits (in this example: CT(c, r)[3]) may be set to be the desired coefficient $K_d$ minus the predetermined mirror coefficient K1 of the mirror current branch M1, KT[3]=$K_d$-K1=250-202=48. In this manner, the tuning current branch 1213 can provide the tuning steps -48, -42, -36, -30, -24, -18, -12, -6, 0, 6, 12, 18, 24, 30, 36, and 42 when the 4 bits {CT(c, r)[3], CT(c, r)[2], CT(c, r)[1], CT(c, r)[0]} of the 4-bit current tuning command CT(c, r) are respectively {0000}, {0001}, {0010}, {0011}, {0100}, {0101}, {0110}, {0111}, {1000}, {1001}, {1010}, {1011}, {1100}, {1101}, and {1111}. One of ordinary skill in the art would understand that this is just to provide an example and is not intended to be limiting.

In accordance with an embodiment of the present invention, turning back to FIG. 1, the LED matrix driving system 10 may further comprise a low voltage differential signaling ("LVDS") module 14. The LVDS module 14 may have a clock differential pin pair (S_CLK+, S_CLK−), a data receive differential pin pair (DT_RCV+, DT_RCV−) and a data return differential pin pair (DT_RTN+, DT_RTN−). The LVDS module 14 may be configured to stream data exchange between a master controller (e.g. a microcontroller, a central processing unit etc.) and the LED matrix driving system 10.

The clock differential pin pair (S_CLK+, S_CLK−) may be configured to receive a system clock signal S_CLK from the master controller. The system clock signal S_CLK may synchronize the data read and write between the master controller and the LED matrix driving system 10. The data receive differential pin pair (DT_RCV+, DT_RCV−) may be configured to read in programmed data such as the programmed grayscale command value GS(c, r) and the U-bit current tuning command CT(c,_r−) for each LED in the LED matrix, the programmed positive integer PI for programming the programmed delay time td etc. from the master controller. The data return differential pin pair may be configured to send feedback data from the LED matrix driving system 10 to the master controller.

In accordance with an embodiment of the present invention, the local Q-bit grayscale command register GSR(c, r) in each one of the plurality of driving modules DRV(c, r) (for each c=0, . . . , N−1, r=0, . . . , M−1) has a unique preset address composed of J-bit column address and K-bit row address, and wherein J is an integer greater than 1 and depending on the number (i.e. N) of columns of the LED matrix, and wherein K is an integer greater than 1 and depending on the number (i.e. M) of rows of the LED matrix. The integer J should satisfy the expression of $2^J \geq N$ while the integer K should satisfy the expression of $2^K \geq M$. For instance, in an example where the LED matrix is of 28 rows and 44 columns, the local Q-bit grayscale command registers GSR(c, r) for each c=0, . . . , N−1, r=0, . . . , M−1 may have a unique send preset address composed of 6-bit column address (i.e. J=6) and 5-bit row address (i.e. K=5).

In accordance with an embodiment of the present invention, the local U-bit current tuning command register CTR(c, r) in each one of the plurality of driving modules DRV(c, r) (for each c=0, . . . , N−1, r=0, . . . , M−1) may also have a unique preset address composed of J-bit column address and K-bit row address, and wherein J is an integer greater than 1 and depending on the number (i.e. N) of columns of the LED matrix, and wherein K is an integer greater than 1 and depending on the number (i.e. M) of rows of the LED matrix.

The LVDS module 14 may be configured to write the programmed grayscale command value GS(c, r) into the local Q-bit grayscale command register GSR(c, r) for the corresponding one LED(c, r) by identifying the unique preset address of the local Q-bit grayscale command register GSR(c, r), for each c=0, . . . , N−1, r=0, . . . , M−1. The LVDS module 14 may also be configured to write the U-bit current tuning command CT(c, r) into the local U-bit current tuning command register CTR(c, r) for the corresponding one LED(c, r) by identifying the unique preset address of the local U-bit current tuning command register CTR(c, r), for each c=0, . . . , N−1, r=0, . . . , M−1.

In accordance with an embodiment of the present invention, for each c=0, 1, . . . , N−1 and r=0, 1, . . . , M−1, the local driving circuit 12 for the corresponding one LED(c, r) of the driving module DRV(c, r) may further comprise a local LED short detection and protection circuit SP(c, r). The local LED short detection and protection circuit SP(c, r) may be configured to detect whether the corresponding one LED(c, r) is short when the driving current IM(c, r) for the corresponding one LED(c, r) is enabled. The local LED short detection and protection circuit SP(c, r) may further be configured to provide a LED short indication signal SP to the local current driver 121(c, r) to latch the pulse width modulated grayscale control signal PWM(c, r) at logic "0" once the corresponding one LED(c, r) has been detected to be short for a predetermined LED short duration (e.g. 30 μs).

In accordance with an embodiment of the present invention, the LED matrix driving system 10 may further comprise a current setting pin short detection and protection circuit 17 coupled to the current setting pin VSET to detect whether the current setting pin VSET is short to the reference ground GND. The current setting pin short detection and protection circuit 17 may be configured to clamp the reference current IREF(c, r) so as to clamp the driving current IM(c, r) for the corresponding one LED(c, r) at a predetermined clamping current (e.g. 38 mA) once it has detected that the current setting pin VSET is short to the reference ground GND. The current setting pin short detection and protection circuit 17 may further be configured to provide a current setting pin short indication signal $S_{VSET}$ to each of the plurality of driving modules DRV(c, r) to force the plurality of LEDs all off once the current setting pin VSET has been detected to be short for a predetermined pin short duration (e.g. 5 μs).

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A LED driving system for a LED matrix having a plurality of LEDs connected in parallel, comprising:

a plurality of driving modules, wherein each one of the plurality of driving modules is configured to drive a corresponding one of the plurality of LEDs; and wherein each one of the plurality of driving modules comprises:

a local current driver having a driver input terminal configured to receive a reference current and a driver output terminal configured to provide a driving current to the corresponding one LED; and a local current tuning module having a U-bit input terminal configured to receive a U-bit current tuning command comprising U bits, wherein U is a positive integer, and wherein the local current tuning module is configured to tune the driving current for the corresponding one LED to reach a desired driving current using the U-bit current tuning command providing a predetermined number of tuning steps, and wherein the predetermined number ranges from 0 to $2^U$.

2. The LED driving system of claim 1, wherein the local current tuning module further comprises:

a clock input terminal configured to receive a clock signal having a high frequency; and a local U-bit current tuning command register, configured to receive and refresh the U-bit current tuning command for the corresponding one LED, wherein the local U-bit current tuning command register is further configured to transfer the U-bit current tuning command for the corresponding one LED to the local current driver for the corresponding one LED.

3. The LED driving system of claim 2, wherein the local current tuning module further comprises:

a local U-bit current tuning level shifter having U bits input terminals to respectively receive the U bits of the U-bit current tuning command, and configured to apply a level shift to each bit of the U-bit current tuning command to provide a level shifted U-bit current tuning command.

4. The LED driving system of claim 2, wherein the local U-bit current tuning command register in each one of the plurality of driving modules has a unique preset address composed of J-bit column address and K-bit row address, and wherein J is an integer greater than 1 and depending on the number of columns of the LED matrix, and wherein K is an integer greater than 1 and depending on the number of rows of the LED matrix.

5. The LED driving system of claim 4, further comprising:

a low voltage differential signaling module, configured to write the U-bit current tuning command into the local U-bit current tuning command register for the corresponding one LED by identifying the unique preset address of the local U-bit current tuning command register.

6. The LED driving system of claim 1, wherein the local current driver comprises:

an operational amplifier, having a first input terminal, a second input terminal and an output terminal;

a compensation circuit coupled to the output terminal of the operational amplifier;

an input current branch, having a first terminal coupled to the first input terminal of the operational amplifier and configured to receive the reference current, a second terminal connected to a reference ground, and a control terminal coupled to the output terminal of the operational amplifier;

a mirror current branch, having a first terminal coupled to the second input terminal of the operational amplifier and the driver output terminal, a second terminal connected to the reference ground, and a control terminal coupled to the control terminal of the first current branch, wherein the mirror current branch is configured to mirror the reference current with a predetermined mirror coefficient to provide a mirrored current at the first terminal of the mirror current branch; and a tuning current branch comprising U controllable current branches respectively controlled by the U bits of the U-bit current tuning command, wherein for each b=0, ..., U-1, the $b^{th}$ controllable current branch of the U controllable current branches has a first terminal coupled to the second input terminal of the operational amplifier and the driver output terminal, a second terminal connected to the reference ground and a control terminal coupled to the control terminal of the first current branch via a $b^{th}$ controllable switch; and wherein the $b^{th}$ controllable current branch is configured to mirror the reference current with a $b^{th}$ tuning coefficient to provide a $b^{th}$ tuning current at the first terminal of the $b^{th}$ controllable current branch when the $b^{th}$ controllable switch is closed in response to the $b^{th}$ bit of the U-bit current tuning command.

7. The LED driving system of claim 6, wherein a difference between every two successive tuning steps of the predetermined number of tuning steps is determined by the $b^{th}$ tuning coefficient.

8. The LED driving system of claim 6, wherein the $b^{th}$ tuning coefficient is set to be proportional to $2^b$ with a predetermined precision factor.

9. The LED driving system of claim 6, wherein:

the input current branch comprises an input transistor having low drain to source voltage drop;

the mirror current branch comprises a mirror transistor having low drain to source voltage drop, wherein the mirror coefficient is determined by a ratio of a conduction channel width to length ratio of the mirror transistor to a conduction channel width to length ratio of the input transistor; and for each b=0, ..., U-1, the $b^{th}$ controllable current branch of the U controllable current branches comprises a $b^{th}$ tuning transistor having low drain to source voltage drop, wherein the $b^{th}$ tuning coefficient is determined by a ratio of a conduction channel width to length ratio of the $b^{th}$ tuning transistor to the conduction channel width to length ratio of the input transistor.

10. The LED driving system of claim 6, wherein the desired driving current is proportional to the reference current with a desired coefficient, and wherein one or more bits of the U-bit current tuning command are in default at a first logic level, and wherein the sum of the tuning coefficients of the controllable current branches controlled by the one or more first logic level bits is set to be the desired coefficient minus the predetermined mirror coefficient of the mirror current branch.

11. The LED driving system of claim 1, wherein each one of the plurality of driving modules further comprises:

a local grayscale control module for adjusting the brightness of the corresponding one LED using Q-bit grayscale command providing $2^Q$ grayscale adjusting steps, wherein the local grayscale control module has a Q-bit input terminal configured to receive a programmed grayscale command value for the corresponding one LED, and wherein the local grayscale control module is configured to provide a pulse width modulated grayscale control signal having a pulse width modulated by the programmed grayscale command value; and wherein the local current driver may further have a control terminal configured to receive the pulse width modulated grayscale control signal from the corresponding local grayscale control module for the corresponding one LED, and to enable the driving current during the pulse width of the pulse width modulated grayscale control signal.

12. The LED driving system of claim 11, wherein each one of the plurality of driving modules further comprises:
a local LED short detection and protection circuit, configured to detect whether the corresponding one LED is short when the driving current for the corresponding one LED is enabled, and further configured to provide a LED short indication signal to the local current driver to latch the pulse width modulated grayscale control signal at logic "0" once the corresponding one LED has been detected to be short for a predetermined LED short duration.

13. The LED driving system of claim 1, further comprising:
a reference current module, coupled to a current setting pin of the LED driving system, and configured to provide a corresponding plurality of reference currents to the plurality of driving modules based on a reference voltage and a resistive device connected to the current setting pin.

14. The LED driving system of claim 13, further comprising:
a current setting pin short detection and protection circuit, coupled to the current setting pin to detect whether the current setting pin is short to the reference ground, and configured to clamp the reference current so as to clamp the driving current for the corresponding one at a predetermined clamping current once it has detected that the current setting pin is short to the reference ground, and configured to provide a current setting pin short indication signal to each of the plurality of driving modules to force the plurality of LEDs all off once the current setting pin has been detected to be short for a predetermined pin short duration.

15. A driving module for a LED, comprising:
a current driver having a driver input terminal configured to receive a reference current and a driver output terminal configured to provide a driving current to the LED; and
a current tuning module having a U-bit input terminal configured to receive a U-bit current tuning command comprising U bits, wherein U is a positive integer, and wherein the current tuning module is configured to tune the driving current to reach a desired driving current using the U-bit current tuning command providing a predetermined number of tuning steps, and wherein the predetermined number ranges from 0 to $2^U$.

16. The driving module of claim 15, wherein the current tuning module further comprises:
a clock input terminal configured to receive a clock signal having a high frequency; and
a U-bit current tuning command register, configured to receive and refresh the U-bit current tuning command, wherein the U-bit current tuning command register is further configured to transfer the U-bit current tuning command to the current driver.

17. The driving module of claim 15, wherein the current driver comprises:
an operational amplifier, having a first input terminal, a second input terminal and an output terminal;
a compensation circuit coupled to the output terminal of the operational amplifier;
an input current branch, having a first terminal coupled to the first input terminal of the operational amplifier and configured to receive the reference current, a second terminal connected to a reference ground, and a control terminal coupled to the output terminal of the operational amplifier;
a mirror current branch, having a first terminal coupled to the second input terminal of the operational amplifier and the driver output terminal, a second terminal connected to the reference ground, and a control terminal coupled to the control terminal of the first current branch, wherein the mirror current branch is configured to mirror the reference current with a predetermined mirror coefficient to provide a mirrored current at the first terminal of the mirror current branch; and
a tuning current branch comprising U controllable current branches respectively controlled by the U bits of the U-bit current tuning command, wherein for each $b=0, \ldots, U-1$, the $b^{th}$ controllable current branch of the U controllable current branches has a first terminal coupled to the second input terminal of the operational amplifier and the driver output terminal, a second terminal connected to the reference ground and a control terminal coupled to the control terminal of the first current branch via a $b^{th}$ controllable switch; and wherein the $b^{th}$ controllable current branch is configured to mirror the reference current with a $b^{th}$ tuning coefficient to provide a $b^{th}$ tuning current at the first terminal of the $b^{th}$ controllable current branch when the $b^{th}$ controllable switch is closed in response to the $b^{th}$ bit of the U-bit current tuning command.

18. The driving module of claim 17, wherein a difference between every two successive tuning steps of the predetermined number of tuning steps is determined by the $b^{th}$ tuning coefficient.

19. The driving module of claim 17, wherein the $b^{th}$ tuning coefficient is set to be proportional to $2^b$ with a predetermined precision factor.

20. The driving module of claim 17, wherein the desired driving current is proportional to the reference current with a desired coefficient, and wherein one or more bits of the U-bit current tuning command are in default at a first logic level, and wherein the sum of the tuning coefficients of the controllable current branches controlled by the one or more first logic level bits is set to be the desired coefficient minus the predetermined mirror coefficient of the mirror current branch.

* * * * *